United States Patent
Wurgler et al.

(10) Patent No.: US 6,321,170 B1
(45) Date of Patent: Nov. 20, 2001

(54) METHOD FOR INTERFERENCE CURRENT AND STATE MONITORING IN RAIL VEHICLES

(75) Inventors: Dieter Wurgler, Thun (CH); Lars Buhrkall, Rodding (DK); Christian Mangold, Ilvesheim; Peter Terwiesch, Edingen, both of (DE)

(73) Assignee: DaimlerChrysler Rail Systems (Technology) GmbH, Berlin (DE)

( * ) Notice: Subject to any disclaimer, the term of this patent is extended or adjusted under 35 U.S.C. 154(b) by 0 days.

(21) Appl. No.: 09/187,688

(22) Filed: Nov. 5, 1998

(30) Foreign Application Priority Data

Nov. 14, 1997 (EP) .................................... 97119996

(51) Int. Cl.$^7$ ................. B60L 9/00; B60L 3/04
(52) U.S. Cl. ................. 702/76; 701/22; 701/36; 246/187 A
(58) Field of Search ............... 702/76; 701/22, 701/36, 56; 246/187 A

(56) References Cited

U.S. PATENT DOCUMENTS 5,713,541 * 2/1998 Schmitz et al. ............... 246/187 A

FOREIGN PATENT DOCUMENTS

WO 96/41728 12/1996 (WO) .

OTHER PUBLICATIONS

Cohen A. et al., "Wavelets: The Mathematical Background", Proceedings of the IEEE, Bd. 84, Nr. 4, Apr. 1, 1996, pp. 44–46.

Cody, M.a., "The Wavelet Packet Transform", Dr. dobb's Journal, Bd. 19, Nr. 4, Apr. 1994 pp. 514–522.

* cited by examiner

Primary Examiner—Kamini Shah
(74) Attorney, Agent, or Firm—Heslin Rothenberg Farley & Mesiti, P.C.

(57) ABSTRACT

The invention relates to a method for forming output signals of an interference current monitor or of a state monitor of an electrical rail vehicle with current being drawn from a power grid, and optionally a current also being delivered back into said power grid, via a current collector. In the case of a state monitor, not only interference currents but also further fault states are identified and signaled. The method steps include detection by measurement and digitization of the vehicle current flowing via the current collector or of other measurement quantities which make it possible to infer vehicle states which leads to interference currents, and digital processing of these measured values with determination of the spectral density of interference currents or of interference values of the other measurement quantities, a multistage system of response thresholds being used in order to evaluate the spectral density.

20 Claims, 6 Drawing Sheets

METHOD FOR INTERFERENCE CURRENT AND STATE MONITORING IN RAIL VEHICLES

BACKGROUND OF THE INVENTION

The invention relates to a method for carrying out interference current or state monitoring by means of an interference current monitor or other state monitor in electrically operated rail vehicles which draw electrical energy from a power grid via a current collector and an overhead contact wire or a conductor rail and optionally feed it back into said grid in the braking mode.

Such rail vehicles require electrical energy at a high current and voltage level in order to be able to fulfill their driving function as well as numerous auxiliary functions. In a manner governed not only by the nonsteady-state operation (acceleration, braking) but also by the technology used (for example converters, but also other nonlinear elements such as transformers, etc.), the current consumption from the grid is necessarily not ideal, in other words always has interference components in addition to a DC component and/or fundamental-frequency AC component. A side effect of the high power level is that interference from the surroundings, including, in particular, from electrical equipment such as signal installations or telecommunications devices, becomes possible in the event of malfunctions in the vehicle. What is important for reliable and secure operation of railroad systems, therefore, is that interference that occurs is identified in good time and eliminated at a suitable time, depending on its severity. In this case, the range of possible measures extends from immediate protective disconnection, for example in the event of sudden failure of an important component and consequential massive exceeding of the interference current components which are permitted in respect of interference with signaling, through to simple database entry, the effect of which is that a part which wears slowly and is not safety-critical is replaced during the next periodic servicing.

FIG. 1 shows the basic concept of a simple interference current monitor, which is also referred to as interference monitor.

What is shown in this case is a diagrammatic illustration of a current path for the vehicle current from a railroad power grid (overhead contact line) 1 via a current collector 2, a main switch 3, driving and auxiliary facilities (traction equipment) 4, a vehicle wheel 5 to a rail 6. With the aid of one or more measuring elements 7, the primary current of the vehicle (vehicle current) is detected and processed in a monitor 8. If the monitor 8 records, in a process, that predetermined limits have been exceeded, it thereupon either intervenes directly in the traction equipment 4 or disconnects the vehicle from the overhead contact line 1 and thus from the electrical grid by means of the main switch 3.

Instead of an interference current monitor, it is also possible to use a so-called state monitor. Such a more general state monitor performs, in addition to the function of interference current monitoring ("interference monitoring"), which is a matter of protecting the entire railroad system and not the individual vehicle, also the function of protection for the vehicle ("vehicle protection"). For this protective function, critical internal (for example filter current) and external (for example grid voltage) quantities are measured and processed in order, if required, to disconnect the vehicle, or isolate it from the grid, for its own protection and for the protection of stationary installations (overhead contact line, substation).

The online monitoring of safety-critical measurement quantities in the case of rail vehicles, for instance of the grid current and its harmonic-frequency components with regard to the influencing of signal installations ("interference monitoring") and also for the protection of the vehicle ("vehicle protection"), is generally known.

In the case of the measured-value processing for this purpose, the use of analog or digital bandpass filters, of window functions in the time domain (for example rectangular windows, Hanning windows, etc.; these windows typically overlap), the discrete Fourier transform (=transformation by convolution with a reference signal of the desired frequency) and also the fast Fourier transform is likewise known.

FIG. 2 shows a known, generic basic structure of an interference current monitor with digital processing. In this case, a primary current I is detected as an analog measured value in a block 21. The measured value is digitized in a block 22—if appropriate after an analog preprocessing. The spectral density of interference currents is determined by means of digital processing in a block 23. In a block 24, finally, likewise by means of digital processing, the calculated spectral density is evaluated using a predetermined response threshold and an output A is formed which is forwarded to a control system or a main switch of the vehicle.

For the postprocessing of the spectral density values determined, in the block 24 either a comparatively long time window can be analyzed, with the result that even a single overshooting of a spectral limit value then effects a tripping of the monitor, or shorter windows can be analyzed and time conditions can be introduced for all the bins considered, for instance disconnection only after N consecutive repetitions or postprocessing with a single-ended delay element which directly counts up overshootings but, in the case of subsequent undershootings, resets the counter again only with a reduced speed.

The fundamental processing structure which is customary in this case is illustrated in FIG. 3. Proceeding from a sampled time signal x(t), values w(t) are formed by multiplication by window function and frequency bins X(f) are obtained by spectral transformation. These frequency bins are evaluated by comparison with a predetermined threshold value with regard to level and duration, for the purpose of forming the output signal A.

A disadvantage of the known interference monitoring methods illustrated in FIGS. 2 and 3 is that they are typically designed for steady-state operating conditions and that their behavior therefore frequently presents difficulties given the occurrence of transients or contact problems at the current collector (for example pantographs). If the monitoring, in other words the monitor, is set to be "highly alert", then the device trips in the event of many transients that occur, as a result of which the availability of the vehicle can be drastically reduced. If, on the other hand, said monitoring is set to be "more tolerant", typically by inserting empirical time conditions, then it is difficult to ensure the safety of the system. This conflict between safety and availability has resulted in a number of operators of railroad traffic systems pronouncing themselves completely against the use of interference current monitors, while others insist on monitors which additionally have to have a very high safety standard.

A further disadvantage of the known methods is the computational outlay required in the course of the digital processing in order to achieve a specific time and frequency resolution.

SUMMARY OF THE INVENTION

The invention is based on the object of specifying methods for forming output signals of an interference current monitor or of a state monitor of an electrical rail vehicle which make it possible better to comply with requirements of safety and availability.

Such improvements are achieved in a monitoring method having the features specified in claim 1 by the use of a multistage system of response thresholds for the evaluation of a spectral density that has been determined. Advantageous refinements are specified in dependent claims.

The object is additionally achieved by means of a monitoring method which is specified in claim 9 and in which, although only one response threshold is worked with—as in the case of known methods—, multirate signal processing, such as "fast wavelet transform" or "wavelet packet transforms", is carried out in order to determine the spectral density.

The proposed measures for improving the method have the advantage of affording vehicle operation with distinctly fewer instances of erroneous tripping.

BRIEF DESCRIPTION OF THE DRAWINGS

The invention and its advantages are described in more detail below with reference to exemplary embodiments and the figures of the drawing.

In the figures.

DETAILED DESCRIPTION

Figure 4:
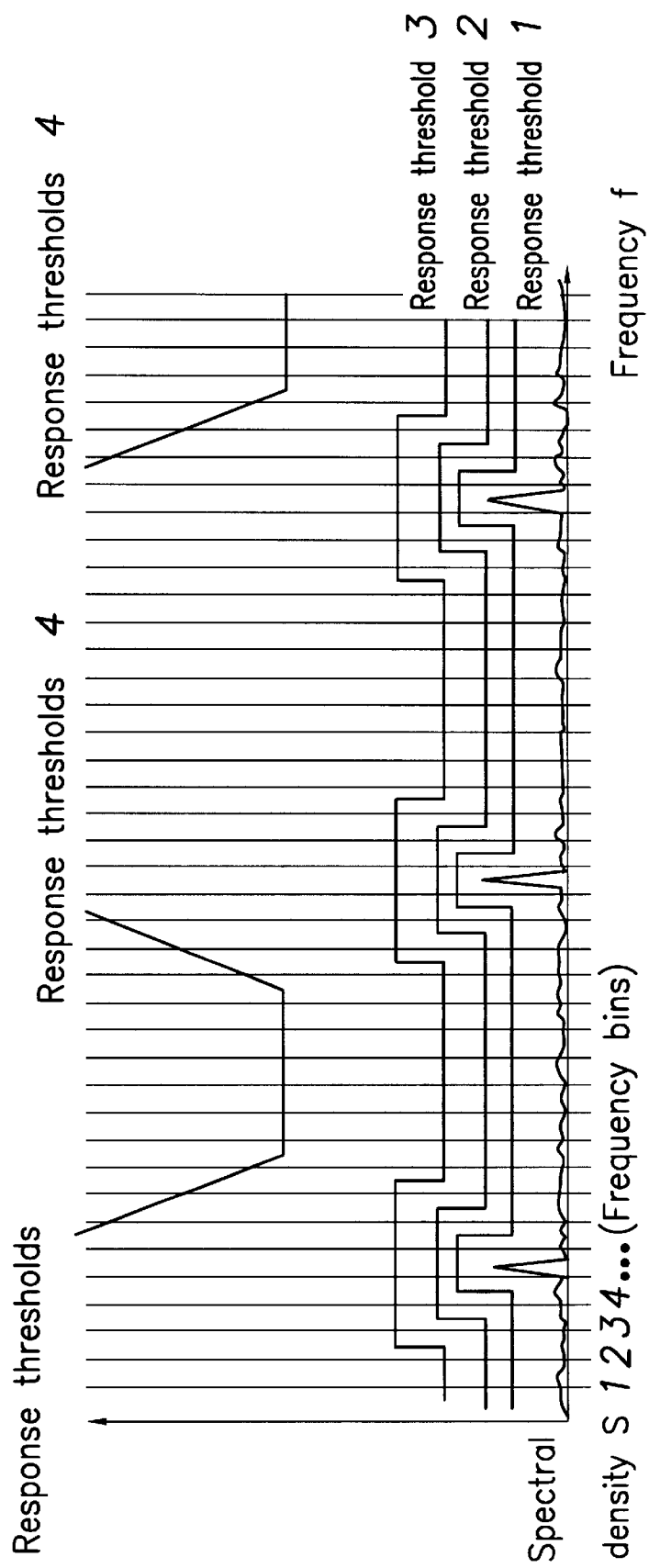
FIG. 4 shows an illustration of the signal evaluation by means of different response thresholds.

A first and particularly essential measure according to the invention consists in the evaluation of the spectral densities that have been determined using a multistage system of response thresholds, as is illustrated by way of example in FIG. 4.

In FIG. 4, a signal s as the result of a spectral transformation and also four different response thresholds 1 to 4 are plotted against the frequency f.

The meaning of these response thresholds and their advantages are explained below.

The safety of the entire traffic system depends, on the one hand, on the conditions in the vehicle, for example interference current levels at a specific frequency during a specific period of time, and, on the other hand, on the ambient conditions, for example broken rail in the region of a highly extensive track occupancy indicating circuit. The two may be regarded as statistically independent of one another; moreover, the worst case of the ambient conditions is a comparatively extremely improbable case. The previous concept constantly evaluated the conditions in the vehicle with regard to the worst case. The new concept, on the other hand, envisages tolerating momentary overshootings of the conditions in the vehicle which are derived from the worst case, as may arise for instance during transients or on account of contact problems at the current collector, provided that they are sufficiently rare enough that the overall system safety remains ensured to the requisite probabilistic extent, and are sufficiently small so that the safety would not be adversely affected even under more probable ambient conditions.

For this purpose, a system of multistage response thresholds is introduced in the evaluation, which system is shown by way of example in FIG. 4. This system permits checking of the actual frequency with which the respective thresholds are overshot. It is thus possible to ensure that, for example, the first threshold must be complied with for more than 90% of the time, threshold 2 99% of the time, and so on, until finally, as a hard limitation at the highest threshold level, the situation where a signal installation is disrupted without an external fault (no broken rail, etc.) must be precluded in all cases.

As the reference time for this relative frequency, it is possible to use, for example, the time between two checks of the vehicle. If the count of the respective overshootings remains below its statistically permissible value, then the counters may be reset to zero. If, on the other hand, the specification is overshot, then more detailed checking of the vehicle with regard to possible causes of faults is necessary. It is noteworthy that the proposed novel method of operation of the monitor includes the traditional monitor with just a single-stage response threshold as a correspondingly configurable special case.

A second innovation is optional and relates to the explicit identification of transients. In a number of cases, it is possible to ascribe an overshooting of a response threshold that has been identified during the evaluation unambiguously to a transient. From previous investigations, it must be known which transients are noncritical for the infrastructure even though the steady-state limit values are momentarily overshot. Such identification of transients may be based, for example, on a pattern comparison with known, measured or simulated transients. If a transient that can be classified as noncritical, for example caused by skid processes or bow jumps, has been identified without doubt as the cause of a threshold value overshoot, then this overshoot is not counted in.

Figure 1:
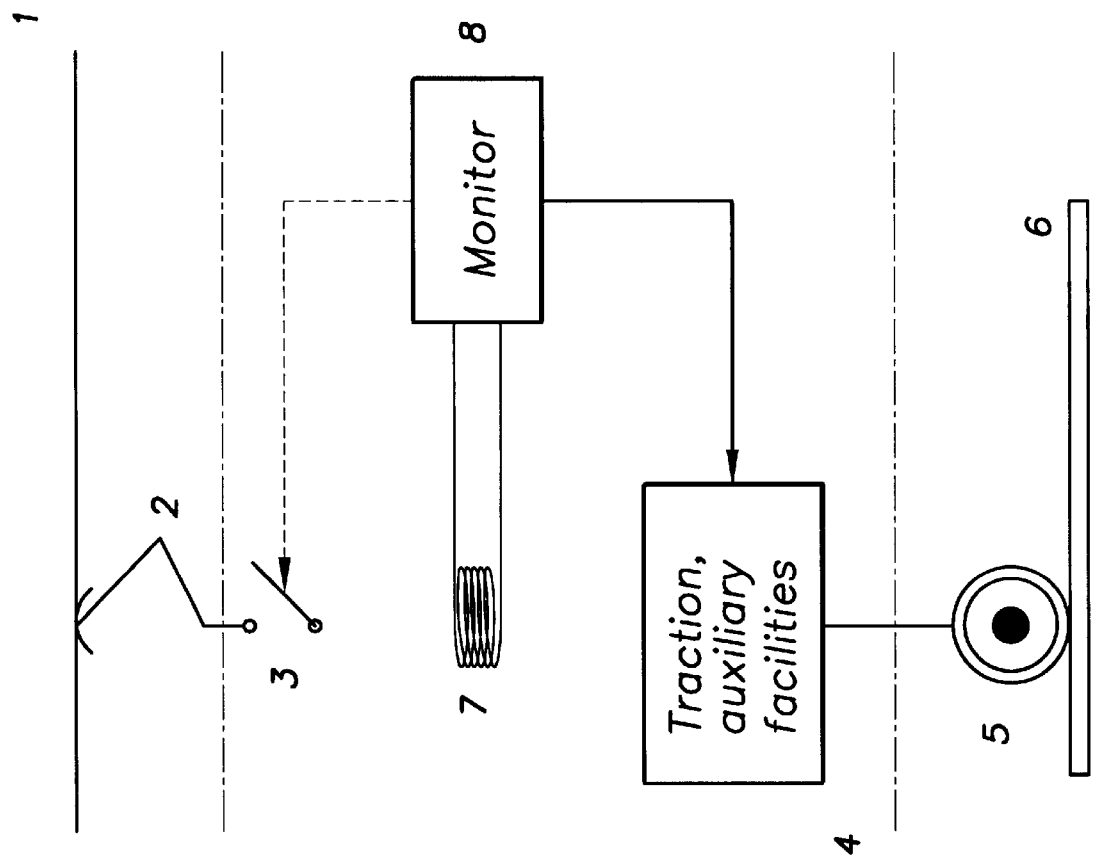
FIG. 1 shows a diagrammatic illustration of the current path in a rail vehicle and the arrangement of a monitor (prior art)
Figure 2:
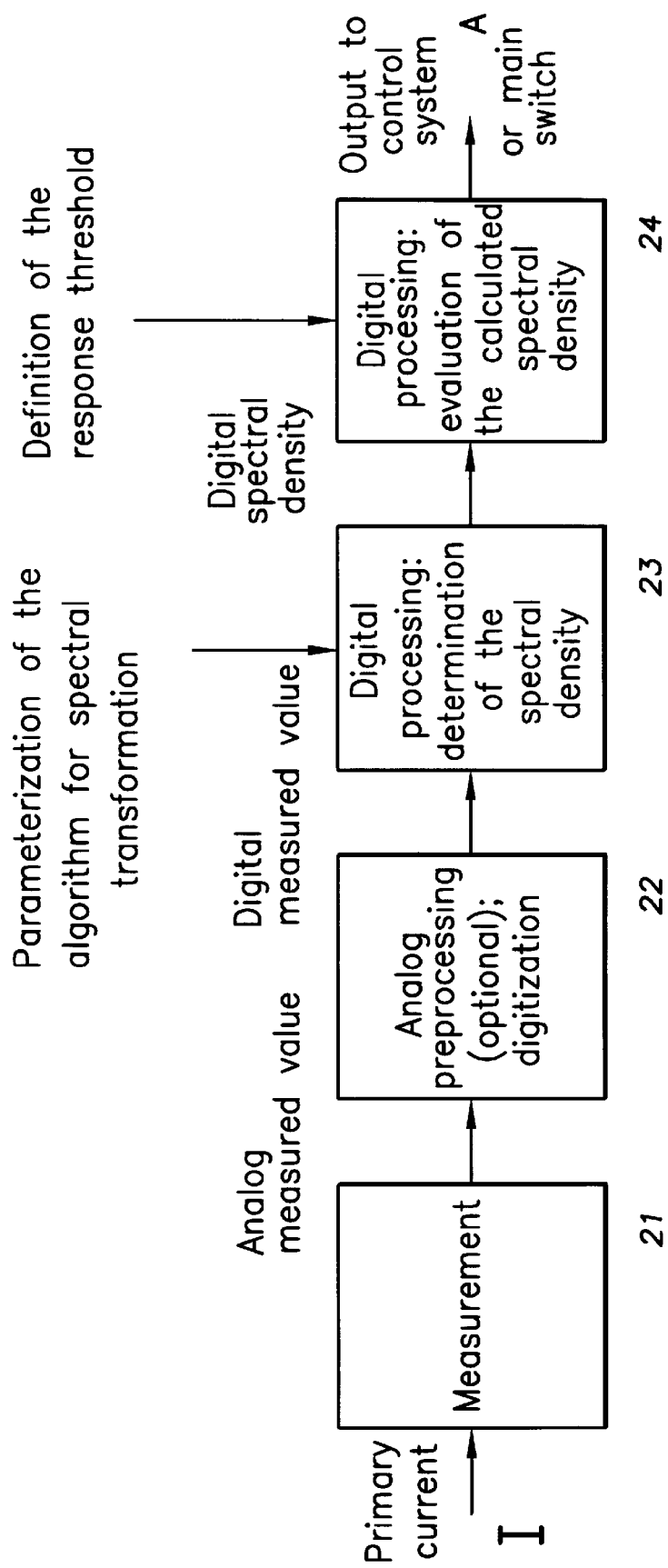
FIG. 2 shows the basic structure of an interference current monitor (prior art)
Figure 3:
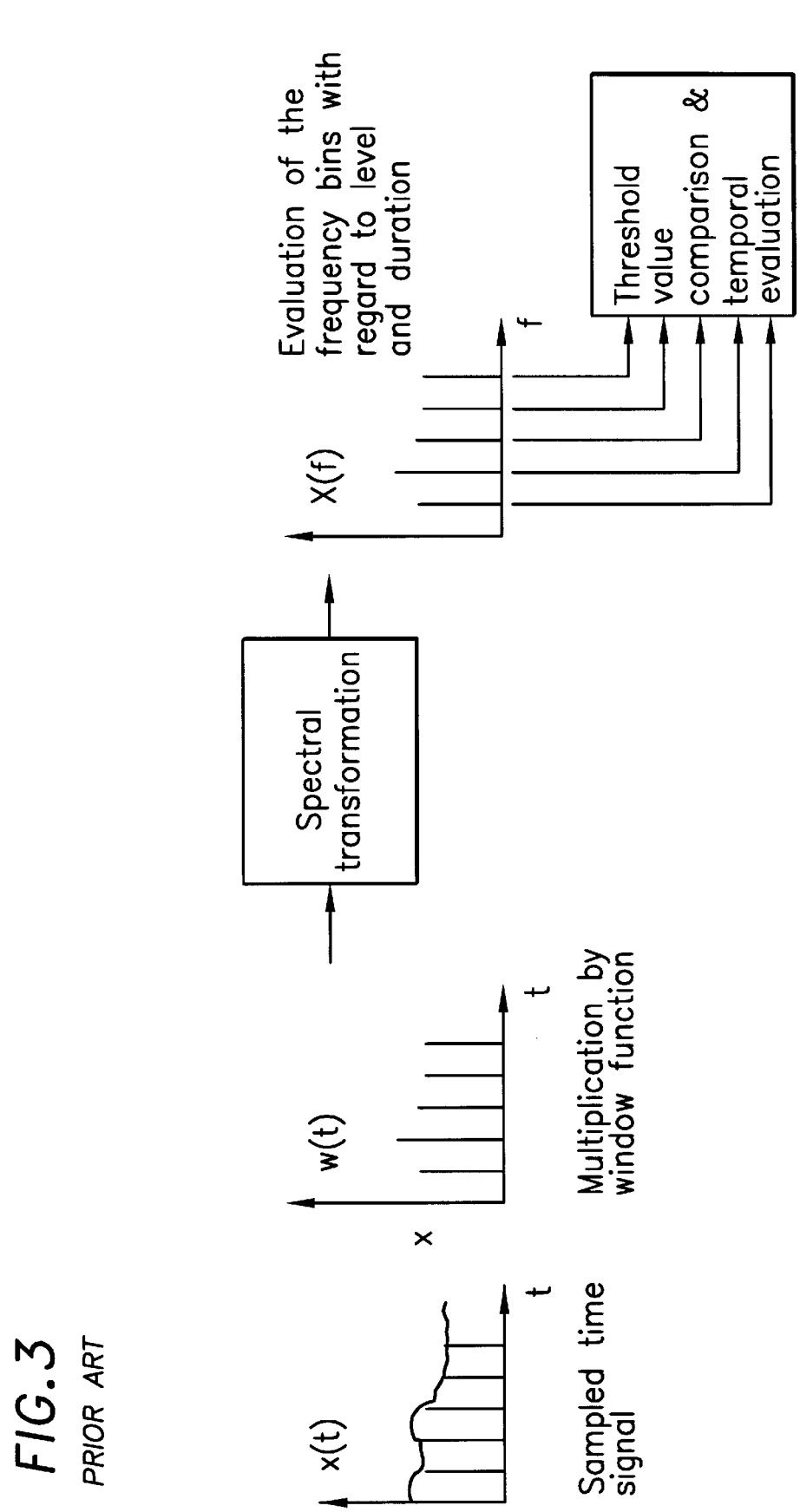
FIG. 3 shows the structure of the signal processing (prior art)
Figure 5:
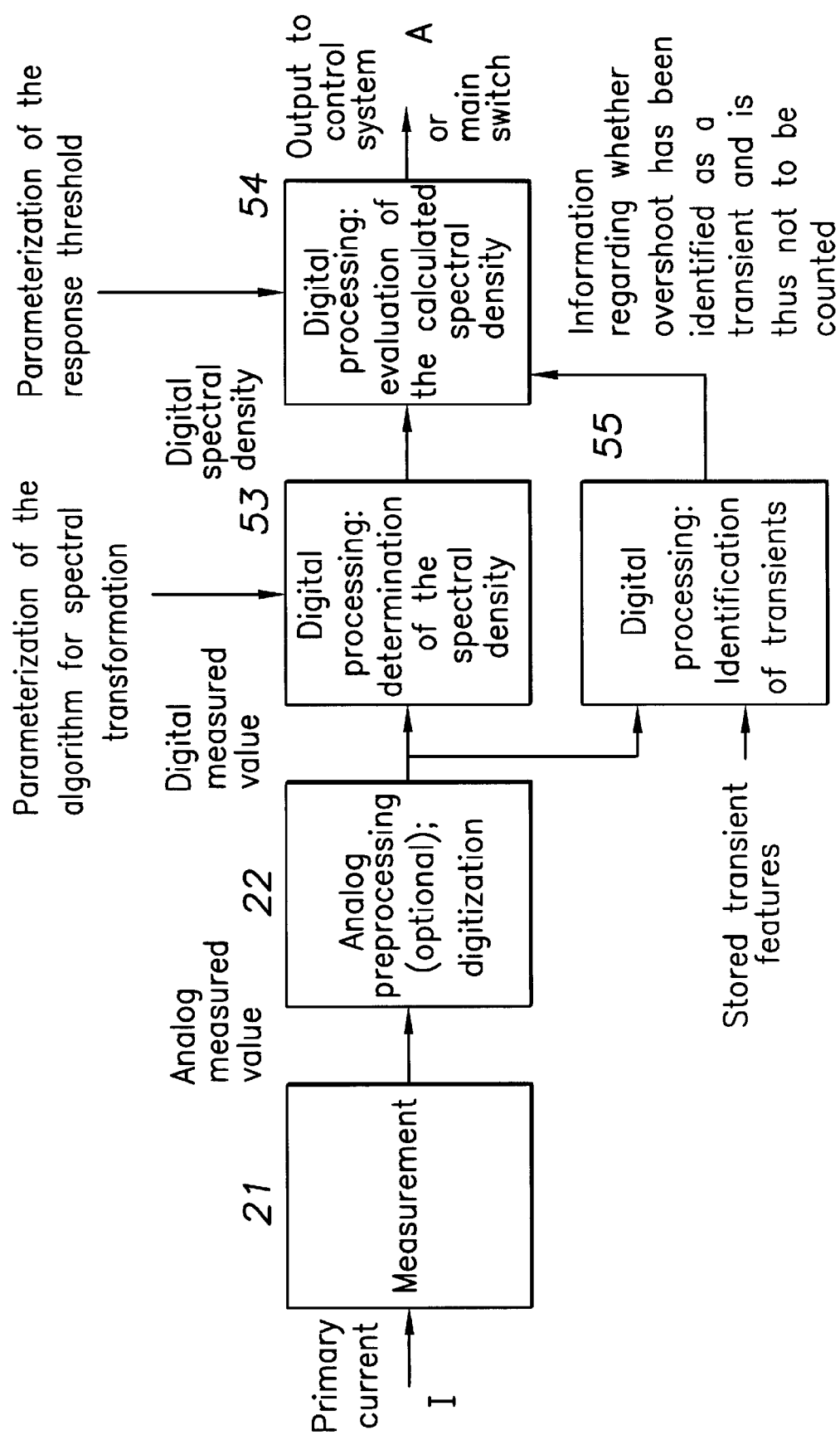
FIG. 5 shows the basic structure of an interference current monitor with augmentations according to the invention.

FIG. 5 shows the basic structure of an interference current monitor having the inventive augmentations for the identification of transients and for the evaluation by means of a response threshold system. The functions of the blocks 21 and 22 correspond to the blocks 21 and 22 shown in FIG. 2. The digital processing in the block 53 may correspond to the processing in accordance with block 23 (FIG. 2), but may also advantageously be effected using different algorithms, as is explained further below as a third innovation. 55 designates a block having processing functions for the identification of transients; 54 designates a block for evaluating the spectral density by means of a plurality of response thresholds which can be parameterized.

A third innovation is likewise optional and relates to the computational processing which can be used both for traditional monitors having just one response threshold and for monitors having a plurality of response thresholds. For the digital processing in the region determination of the spectral density, i.e. in block 53 (FIG. 5), it is possible either to use one of the methods already used for this purpose (such as fast Fourier transform or discrete Fourier transform) or to carry out multirate signal processing, e.g. "fast wavelet transform" or "wavelet packet transform". Such methods are described for example in A. Cohen, J. Kovacevic; Wavelets: The Mathematical Background; Proceedings of the IEEE. vol. 84, No. 4, pp. 514–522, April 1996, and also in M. A. Cody; The Wavelet Packet Transform. Dr. Dobb's Journal, April 1994, pp. 44–54 and N. Fliege; Multiratensignalverarbeitung [Multirate signal processing], Verlag B. G. Teubner, Stuttgart, 1993.

Figure 6:
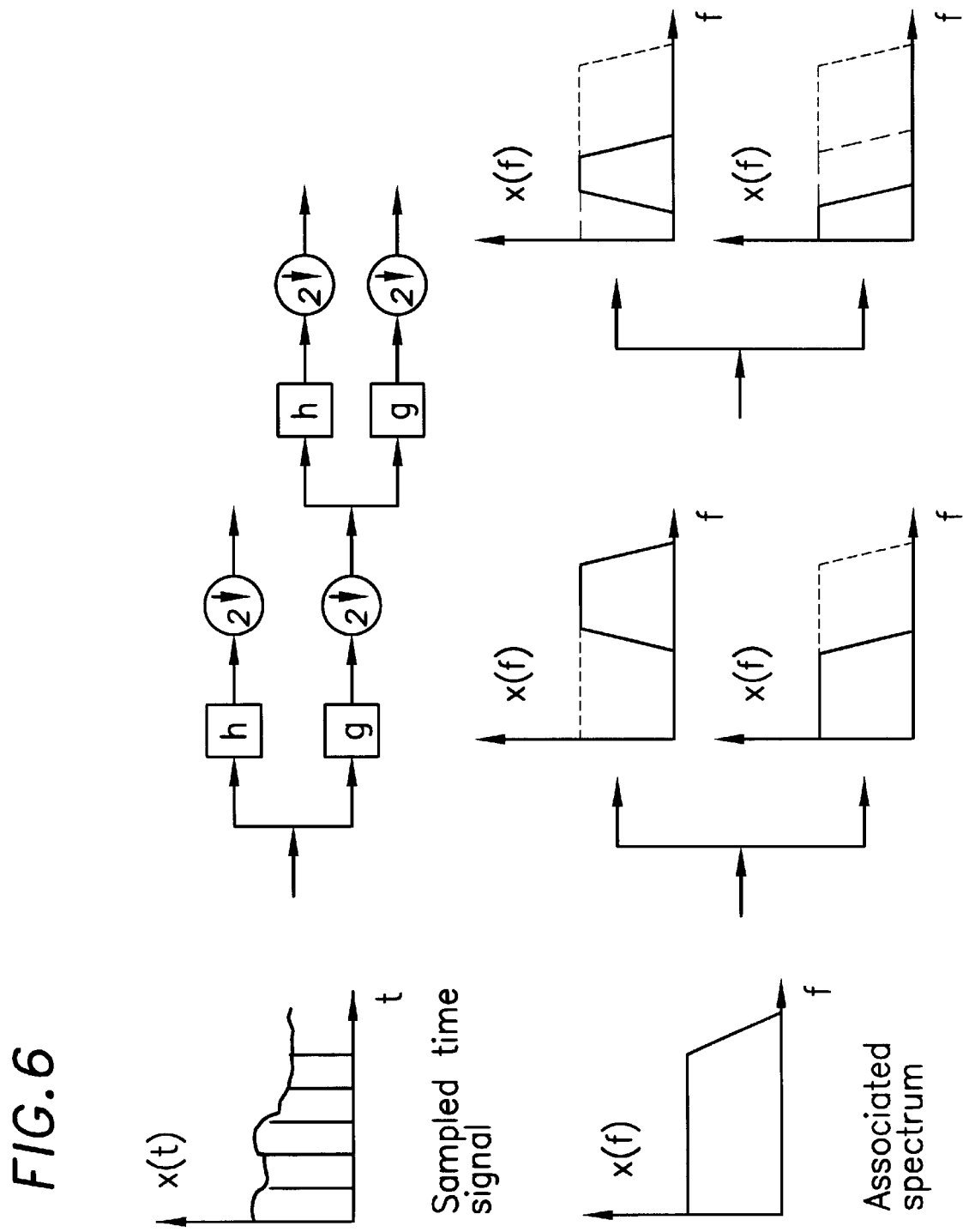
FIG. 6 shows a transformation with the aid of a wavelet or wavelet packet filter bank in an upper part of the illustration; a processing within the filter bank in a selected frequency range is illustrated in the lower part.

FIG. 6 shows the implementation of the transformation with the aid of multirate signal processing, for instance of the wavelet or wavelet packet transform. The upper part of FIG. 6 shows how a time signal x(t) is decomposed into a higher- and a lower-frequency component in a first step without previous windowing with the aid of wavelet or wavelet packet filtering. This type of spectral decomposition is also possible into more than two identical parts; generally one speaks of quadrature networks or "quadrature mirror filters" in the case of such decompositions. On the right-hand side, given suitable choice of the basic functions ("mother wavelets") for the filter design, a result is directly obtained which, although not identical, is, in terms of the use, in correspondence with the bins of the Fourier transform including temporal windowing and temporal integration of the spectra. The circles in this case indicate that, for multirate filtering, in the case shown, with an input of N data points on each filter branch, only N/2 data points emerge at the output in each case. A generalization from 2 to M filter branches and thus N/M data points per branch is possible. g and h designate filters which are also referred to as quadrature mirror filter pair.

The illustration in the lower part of FIG. 6 also reveals that it is possible to calculate only those parts of the filter tree which are actually required for bins to be monitored. This is where there is a difference between wavelet transform, in which in each case only the lower-frequency component is decomposed further, and wavelet packet transform, in which the tree can have a customized form.

A first advantage of the multirate signal processing at this point is the lower computational outlay of the multirate methods (complexity: order N operations for the fast wavelet transform with pyramid algorithm, compared with N log N operations for the fast Fourier transform). The second advantage is that these methods permit a time-frequency analysis, thereby enabling a combination of the two steps determination of the spectral density and evaluation (with regard to temporal criteria). The third advantage consists in the fact that the wavelet packet transform permits the calculation, in a customized manner, of values only for those bins which are actually intended to be evaluated.

A fourth innovation relates to the location of the measurement. In addition to the measurement quantity of vehicle current, it is also possible to use one or more electrical quantities, which are better insulated from ambient influences but in which an interference with the vehicle can likewise be identified. This applies for example to the monitoring of the intermediate circuit voltage.

For the purpose of health monitoring, such monitoring reacts more selectively to faults in the vehicle, has a greater signal-to-noise ratio and, consequently, results in fewer instances of erroneous tripping. Individual faults can be detected early on, even if they have a dangerous effect on the grid current only in combination with further defects, such as failure of filter components, for example. A precondition, however, is that the elements situated between the measurement quantity chosen and the grid current, for example an interposed filter, function properly. In order to prevent a failure of interposed components, such as filters, for example, from remaining unnoticed, these components can be monitored, for example by comparison (correlation function) of various measurement quantities, for example of the intermediate circuit voltage and of the vehicle current.

What is claimed is:

1. A method for forming output signals of an interference current monitor or of a state monitor of an electrical rail vehicle with current being drawn from a power grid, and optionally a current also being delivered back into said power grid, via a current collector, the state monitor identifying and signaling not only interference currents but also further fault states, the method having the steps below:
    a) detection by measurement and digitization of the vehicle current flowing via the current collector, and
    b) digital processing of the detected vehicle current with determination of spectral density of interference currents, a multistage system of response thresholds being used in order to evaluate the spectral density, in order to form said output signals.

2. The method as claimed in claim 1, wherein in the event of overshootings of response thresholds, a check is made to see whether these can be ascribed to a transient of which, on the basis of previous investigations, it is known that it is noncritical for the infrastructure, such overshootings not being taken into consideration during the formation of the output signals.

3. The method as claimed in claim 1, wherein the determination of the spectral density is carried out by means of multirate signal processing.

4. The method as claimed in claim 2, wherein the determination of the spectral density is carried out by means of multirate signal processing.

5. The method as claimed in claim 1, wherein the intermediate circuit voltage of a converter system of the vehicle is used as a different measurement quantity in addition to the detection of the vehicle current flowing via the current collector.

6. The method as claimed in claim 2, wherein the intermediate circuit voltage of a converter system of the vehicle is used as a different measurement quantity in addition to the detection of the vehicle current flowing via the current collector.

7. The method as claimed in claim 3, wherein the intermediate circuit voltage of a converter system of the vehicle is used as a different measurement quantity in addition to the detection of the vehicle current flowing via the current collector.

8. The method as claimed in claim 4, wherein an intermediate circuit voltage of a converter system of the vehicle is used as a different measurement quantity in addition to the detection of the vehicle current flowing via the current collector.

9. A method for forming output signals of an interference current monitor or of a state monitor of an electrical rail vehicle with current being drawn from a power grid, and optionally a current also being delivered back into said power grid, via a current collector, the state monitor identifying and signaling not only interference currents but also further fault states, and the method having the steps below:
    a) detection by measurement and digitization of the vehicle current flowing via the current collector, and
    b) digital processing of the detected vehicle current with determination of spectral density of interference currents, a multirate signal processing being carried out, and only one response threshold being used in order to evaluate the spectral density, in order to form said output signals.

10. A method for forming output signals of an interference current monitor or of a state monitor of an electrical rail vehicle with current being drawn from a power grid, and optionally a current also being delivered back into said power grid, via a current collector, the state monitor identifying and signaling not only interference currents but also further fault states, the method having the steps below:
   a) detection by measurement and digitization of a measurement quantity which makes it possible to infer vehicle states which lead to interference currents, and
   b) digital processing of the measurement quantity with determination of spectral density of interference values of said measurement quantity, a multistage system of response thresholds being used to evaluate the spectral density, in order to form said output signals.

11. The method as claimed in claim 10, wherein in the event of overshootings of response thresholds, a check is made to see whether these can be ascribed to a transient of which, on the basis of previous investigations, it is known that it is noncritical for the infrastructure, such overshootings not being taken into consideration during the formation of the output signals.

12. The method as claimed in claim 10, wherein the determination of the spectral density is carried out by means of multirate signal processing.

13. The method as claimed in claim 11, wherein the determination of the spectral density is carried out by means of multirate signal processing.

14. The method as claimed in claim 10, wherein said measurement quantity comprises an intermediate circuit voltage of a converter system of the vehicle.

15. The method as claimed in claim 11, wherein said measurement quantity comprises an intermediate circuit voltage of a converter system of the vehicle.

16. The method as claimed in claim 12, wherein said measurement quantity comprises an intermediate circuit voltage of a converter system of the vehicle.

17. The method as claimed in claim 13, wherein said measurement quantity comprises an intermediate circuit voltage of a converter system of the vehicle.

18. A method for forming output signals of an interference current monitor or of a state monitor of an electrical rail vehicle with current being drawn from a power grid, and optionally a current also being delivered back into said power grid, via a current collector, the state monitor identifying and signaling not only interference currents but also further fault states, and the method having the steps below:
   a) detection by measurement and digitization of a measurement quantity which makes it possible to infer vehicle states which lead to interference currents, and
   b) digital processing of the measurement quantity with determination of spectral density of interference values of the measurement quantity, a multirate signal processing being carried out, and only one response threshold being used in order to evaluate the spectral density, in order to form said output signals.

19. The method as claimed in claim 18 wherein said measurement quantity comprises an intermediate circuit voltage of a converter system of the vehicle.

20. A method for forming output signals of an interference current monitor or of a state monitor of an electrical rail vehicle with current being drawn from a power grid, and optionally a current also being delivered back into said power grid, via a current collector, the state monitor identifying and signaling not only interference currents but also further fault states, and the method having the steps below:
   a) detection by measurement and digitization of the vehicle current flowing via the current collector and an other measurement quantity which makes it possible to infer vehicle states which lead to interference currents, and
   b) digital processing of the detected vehicle current and said other measurement quantity with determination of spectral density of interference currents, and of interference values of the other measurement quantity, a multirate signal processing, being carried out, and only one response threshold being used to evaluate the spectral density, in order to form said output signals.

* * * * *